Inventors:
Edward E. Mitchell,
Albert D. Perry Jr.,
by Allen E. Angott
Their Attorney.

June 15, 1965 E. E. MITCHELL ETAL 3,189,826

METHOD AND APPARATUS FOR DEMODULATING MULTI-PHASE MODULATED SIGNALS

Filed May 9, 1960 3 Sheets-Sheet 2

Inventors:
Edward E. Mitchell,
Albert D. Perry Jr.,
by Allen E. Angott
Their Attorney.

Inventors:
Edward E. Mitchell,
Albert D. Perry Jr.,
by Allen E. Amgott
Their Attorney.

3,189,826
Patented June 15, 1965

3,189,826

METHOD AND APPARATUS FOR DEMODULATING MULTI-PHASE MODULATED SIGNALS

Edward E. Mitchell and Albert D. Perry, Jr., Ithaca, N.Y., assignors to General Electric Company, a corporation of New York Filed May 9, 1960, Ser. No. 27,665
7 Claims. (Cl. 325—418)

This invention relates to communication systems, and more particularly to the type of system in which a message is transmitted or received in the form of a carrier wave having predetermined variations in phase which represent the information implicit in the carrier wave.

In the present state of the art of communications technology, it is known that data or information may be transferred from place to place by selectively varying the phase of a transmitted carrier wave. Within the receiver which is employed for retrieving the data implicit in such a carrier wave, it is necessary to compare the incoming phase shifted carrier with a reference signal. The reference signal must be of the same frequency as the transmitted carrier wave, and remain substantially in phase with the carrier during periods when the carrier is not modulated. In some prior art systems, the reference signal is propagated by the transmitter, while in others a reference signal is generated within the receiver by means of a local oscillator, or the like. The comparison effected within the receiver is quite commonly accomplished by means of phase comparator type circuits.

For a wide class of signals, the phase of the modulated carrier at a set of uniformly spaced instants of time determines the intelligence which is transmitted. In a noise-free situation, this means that there is a set of allowed phase positions at these instants, and that the actual signal phase a each such instant is closest to the allowed phase which reflects the modulated information.

The method of conveying a message in this manner usually involves some technique for modulating a carrier signal such as an ordinary sine wave in accordance with one or more quantized information inputs. The information to be transmitted may correspond with the instantaneous phase position of the carrier wave, or the magnitude of some predetermined component of the carrier which occupies a particular phase relationship with respect to the reference signal.

For instance, a conventional sine wave carrier may be 200% amplitude modulated by a binary information signal to form a binary double sideband suppressed carrier signal. The modulated carrier thus may occupy either of two phases spaced 180° apart. This is a two-phase form of multi-phase modulation. A second binary double sideband suppressed carrier signal having a frequency identically the same as that of the first, and in phase quadrature therewith, may be added. With this modification, any transitions which occur in the binary data for the second signal are caused to occur at times when transitions in the first binary information signal are also permitted to occur. When the transmission channels are thus synchronized, the resulting output waveform may experience any one of four different phase positions. The two synchronized binary double sideband suppressed carrier channels operating in quadrature phase relationship in this manner provide a single four-phase channel.

The number of voltage vectors in differing phase relationships used in such a system may, of course, be extended beyond the four permitted phase positions referred to in this example. For instance, three-phase systems in which the voltage vectors are allowed to selectively occupy any one of three particular phase positions 120° apart are practical, and perform satisfactorily.

In one of these systems, it may be assumed that three states of the carrier wave correspond to −1, 0, and +1. If the transmitted data during one interval includes the sequence −1, 0, 0, −1, +1, +1 for instance, the phase of the transmitted wave may be −120°, 0°, 0°, −120°, 120°, 120° at successive sampling instants with respect to the reference signal. It will be appreciated that it is also possible to code the sequence by employing the difference between successive phase positions, rather than the phases themselves.

In this type of system, the phase of the signal changes smoothly between sampling instants, because of the limitation in the bandwidth employed in the transmission channel.

When the bandwidth allowed for transmitting phase modulated signals is sharply restricted, the transitions between phases are generally no longer abrupt, and the details of the transmitted wave may depend on the method of generation, such as the order in which non-linear operations and band limiting are accomplished.

From the foregoing discussion, it will be observed that phase modulation systems share the common feature of employing a modulation process in which the message to be transmitted is related to the phase of the transmitted wave at the sampling instants, but is not necessarily thus related at other times. In general, the techniques utilized in present day apparatus for this purpose are incapable of providing optimum data transfer by phase modulation processes without employing a relatively wide bandwidth. This means that most known types of apparatus are limited to the recovery of multiphase signals from a wide band spectrum. Moreover, techniques such as the type of non-linear operation used to demodulate large bandwidth signals are completely unsuitable for use in connection with restricted or minimum bandwidth signals.

If the encoding is done in phase changes, the previous section of the incoming wave may be stored and used as a reference signal for demodulating the next portion of the carrier, but this is known to involve a noise penalty. In one very well known system employing a stored reference wideband detection scheme to accomplish four-phase detection, efficient use of the spectrum is obtained only by assembling many four-phase channels as a group for simultaneous transmission, Although the bandwidth per channel is reduced to a reasonable amount by using many overlapping bands, the operation cannot be characterized as true minimum bandwidth operation.

According to the present invention, the inherent complexity of employing many channels in parallel is entirely eliminated. The present invention contemplates method and apparatus for accomplishing detection of multi-phase modulated waves transmitted over a minimum bandwidth channel. The multi-phase receiver constructed according to the present invention contains a local oscillator which accurately reconstructs in phase and frequency the carrier propagated by the transmitter. To state it another way, the receiver reconstitutes the carrier which would be received if the transmitter were propagating steady carrier. However, the transmitter does not propogate carrier, as such, because it is operating in a suppressed carrier mode. In this receiver, the demodulator circuit is arranged to sample the phase of the received wave at those instants when it is constrained, in the absence of noise, to occupy one of the phase positions corresponding to the modulated data. The signals thus sampled are compared to a local oscillator's estimate of the set of values of allowed phases, and the smallest indicated phase error is used to correct the phase of the local oscillator. Smoothing may be employed to cause the corrective signal to reflect the weighted sum of a number of error measurements in order to average out the effects of extraneous noise. In one preferred embodiment of the invention, the local oscillator and the associated control loop possess a number of equilibrium or reference points equal to the number of allowed phases in the modulated signal and both detection and phase lock functions utilize the same demodulator circuits.

By using a second carrier wave in phase quadrature with the first carrier, signaling speeds twice as rapid as those provided by conventional A.M. or F.M. signaling techniques are realized without the decrease in signal to noise ratio which attends the use of such prior art techniques. Moreover, under proper conditions, a form of multilevel phase modulation may be produced by using multiphase modulation methods which employ more than four allowed phases. With the invention, problems such as level shift, AGC time lags, and the like, which characterize conventional A.M. systems are eliminated.

One outstanding property of the presently employed four-phase modulation scheme is the increase in channel capacity provided, which equals that provided by single-sideband operation. This increase is provided without any necessity for tolerating many of the problems which characterize conventional straight single-sideband suppressed carrier operation. The four-phase modulation scheme practiced with the demodulator circuits provided by the present invention has many applications. For instance, by using two-phase modulation for the most significant information bit, and more phases for the less significant bits, it is possible to provide coded voice transmission along with data on one UHF 50 kc channel. It is also possible to multiplex analog voice with binary data and, by using the demodulation techniques of the present invention, a carrier adequate to provide efficient retrieval of both signals may be readily generated. Moreover, the application of the invention to more than four allowed voltage vectors and phase positions is readily accomplished, with equally superior performance and efficiency.

Accordingly, therefore, one primary object of the present invention is to disclose method and apparatus which permits the use of phase shift modulation techniques in conjunction with a minimum bandwith frequency spectrum.

Another object of this invention is to disclose a method of deriving a phase comparison reference signal in order to provide a local oscillator and associated control loop with a number of equilibrium points equal to the number of allowed phases in a modulated signal.

Still another object of the present invention is to provide method and means for de-modulating multiphase modulated waves without requiring the use of a wide band signal.

A further object of the present invention is to provide a method of deriving a series of voltage functions to produce a composite amplitude selective function which experiences zero values for all integral multiples of 90°.

A still further object of the present invention is to disclose method and apparatus for generating a composite amplitude selective function which exhibits a number of null points or stable points equal to the number of allowed phases in the modulated signal.

These and other objects and advantages of the present invention will become apparent by referring to the accompanying detailed description and drawings, in which like numerals indicate like parts, and in which.

Figure 1A:
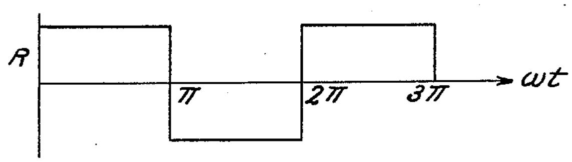
FIGURE 1A shows the received carrier wave after a limiting process has been performed to provide a square wave.

Turning to the detailed description of the invention, and more particularly to the drawings, reference will now be made to the waveform diagrams illustrated in FIGURE 1A, FIGURE 1B, and FIGURE 1C. While the detailed description of the invention will be discussed in connection with a four-phase system, it will become obvious to those skilled in the art that the invention is applicable to systems other than four-phase. The diagram in FIGURE 1A shows the received carrier wave after a limiting process has been accomplished to provide a square wave. Although the function plotted in FIGURE 1A as well as in the other figures takes the form of a square wave, it will be appreciated that the system works equally well with sine wave functions.

In the initial condition, it may be assumed that the receiver circuit provided by the invention is presented with a quaternary phase modulated signal. By an initial adjustment, as performed by a conventional AFC loop or the like, the local oscillator frequency within the receiver is set to substantially duplicate the incoming carrier frequency. The objective, of course, is to servo the local oscillator signal to the carrier with respect to both frequency and phase in order to produce a demodulating signal. As stated hereinbefore, the receiver must reconstitute the carrier which would be received if the transmitter sent steady carrier. However, the transmitter does not send carrier, as such, but is operating in a suppressed-carrier mode. With this demodulating signal, the predetermined variations in phase in the incoming quaternary signal may be compared with a reference signal which duplicates the carrier wave as transmitted in an unmodulated condition by the transmitter, and the message implicit in the successive phase shifts may be retrieved.

Figure 1B:
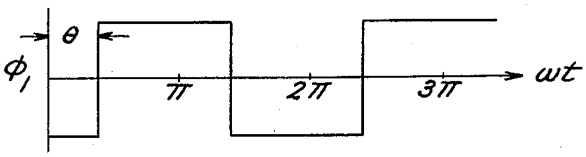
FIGURE 1B shows one of the quadrature signals produced by the local oscillator within the receiver after a limiting process has been performed on this signal to produce a square wave, and indicates one value of phase difference by means of the symbol $\theta$.

Directly beneath the curve of the received signal R shown in FIGURE 1A a second waveform is illustrated in FIGURE 1B. The curve shown in this figure represents one of the quadrature signals generated by the local oscillator within the receiver, after the sine wave signal thus produced has been limited to produce a square waveform. It will be noted in FIGURE 1B, that the waveform is identified by the symbol $\phi_1$.

This waveform $\phi_1$ will be seen to lag the received signal R by an arbitrarily chosen value of phase difference $\theta$.

Figure 1C:
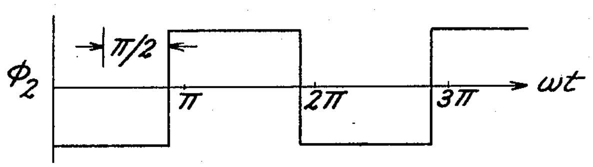
FIGURE 1C shows the other quadrature signal produced by the local oscillator within the receiver after this signal has been limited to produce a square wave.

In FIGURE 1C, the other quadrature sine wave signal generated by the local oscillator is shown after a limiting process has been performed to produce a square wave. This waveform is identified by the symbol $\phi_2$. It will be appreciated in connection with FIGURE 1C that a 90° phase difference between the waveform $\phi_2$ and $\phi_1$ is always maintained, regardless of the value $\theta$ by which the first quadrature signal $\phi_1$ may lead or lag the phase of the received signal R.

Figure 5:
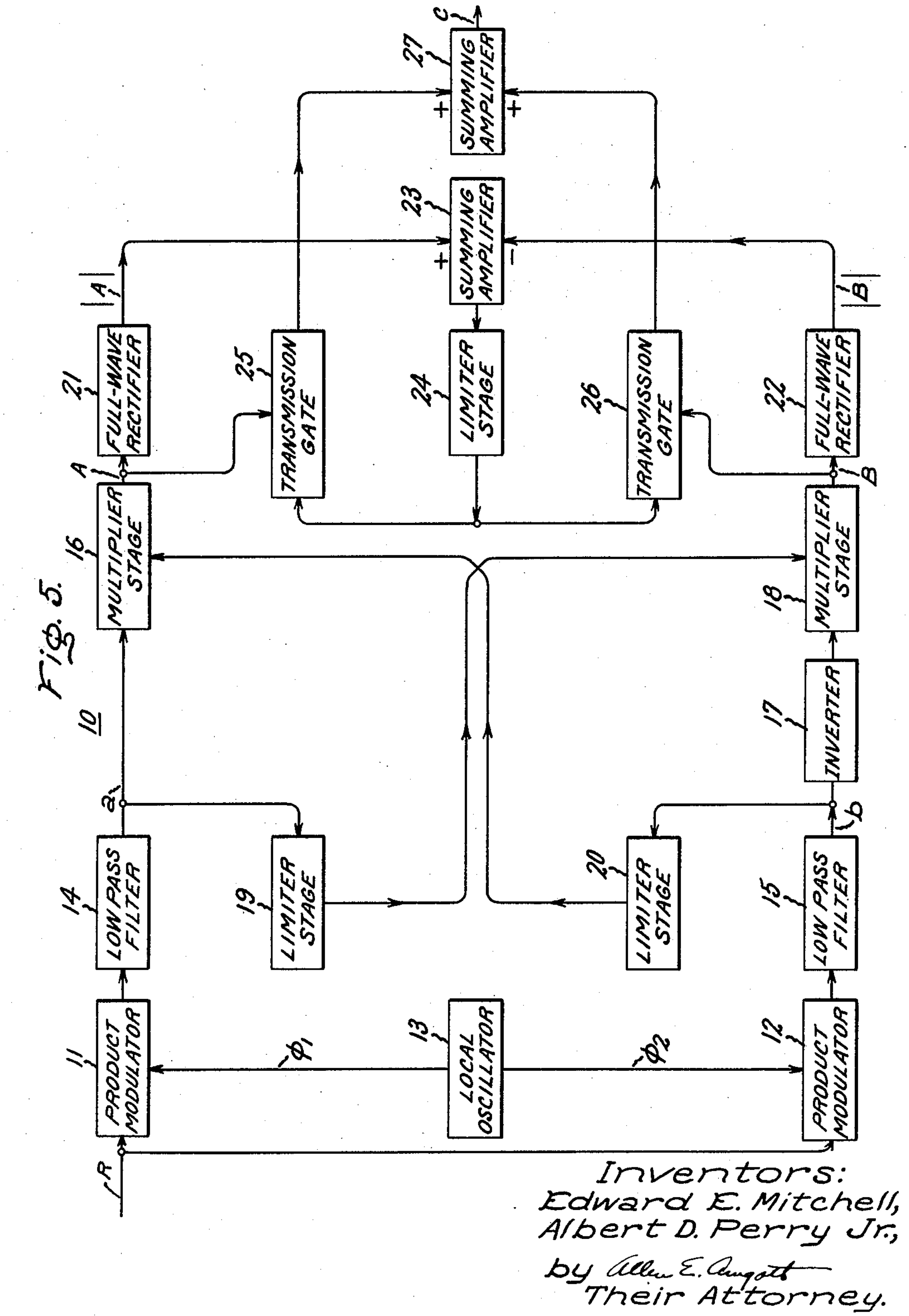
FIGURE 5 illustrates in block diagram form the circuits and components of a phase comparator stage provided by the present invention.

The demodulator circuit provided by the present invention and explained in detail in connection with the detailed description of FIGURE 5, is used to operate upon the waveforms shown in FIGURE 1A, FIGURE 1B and FIGURE 1C in order to produce a pair of product functions. In the demodulator circuit, the waveform R shown in FIGURE 1A is first multiplied by the corresponding values from the waveform shown in FIGURE 1B to derive a first product function which is given by:

$$a = Rx\phi_1$$

The received signal R is then multiplied by the values of the waveform shown in FIGURE 1C to yield a second product function which is given by:

$$b = Rx\phi_2$$

The product functions "*a*" and "*b*" contain useful information in their low frequency component. These product functions are passed through a low pass filter in order to produce the waveforms shown in FIGURE 2A and 2B. Therefore, the waveform in 2A shows the first product function "*a*" after low pass filtering, and the waveform shown in FIGURE 2B shows the second product function "*b*" after this function has been subjected to low pass filtering.

Figure 2A:
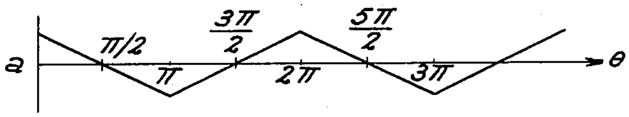
FIGURE 2A shows a first product function which represents a curve of values taken from the square wave in FIGURE 1A as multiplied by corresponding values taken from the square wave quadrature signal shown in FIGURE 1B and filtered. The filtered product function is plotted against successive values of phase difference $\theta$.
Figure 2B:
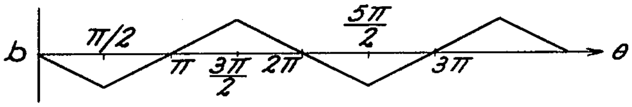
FIGURE 2B shows a second product function which represents a curve of values taken from the square wave in FIGURE 1A as multiplied by corresponding values taken from the square wave quadrature signal shown in FIGURE 1C, and filtered. This filtered product function is plotted against successive values of phase difference $\theta$.

It should be noted in this connection that the independent variable employed on the abscissa in FIGURE 1A, FIGURE 1B, and FIGURE 1C represents the product of elapsed time and angular velocity, while the independent variable for the horizontal axis in FIGURE 2A and FIGURE 2B represents values of phase difference $\theta$.

The filtered product functions shown in FIGURE 2A and 2B are then applied to additional circuitry for the purpose of generating a pair of polarity selective functions. These polarity functions are designated "A" and "B" and have the following form:

$$A = a \operatorname{sgn} b$$

$$B = -b \operatorname{sgn} a$$

In these relationships the term sgn (signum) is simply used to indicate the algebraic sign of the function "*a*" and "*b*." For example:

$$\operatorname{sgn} a = \frac{a}{|a|}$$

and $$\operatorname{sgn} b = \frac{b}{|b|}$$

The significance of the waveforms shown in 2A and 2B may be readily explained. If the value of "*a*" for any chosen point on the curve is multiplied by the polarity of the corresponding point on curve "*b*," one point on the function "A" is produced. Conversely, if any value on the waveform "*b*" in FIGURE 2B is multiplied by the polarity of the corresponding point on the function "*a*," one point on the function "B" is derived.

Figure 3A:
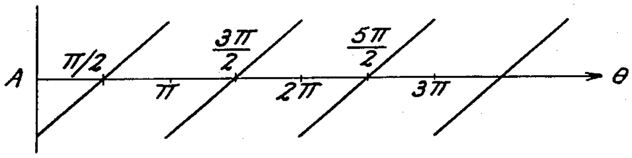
FIGURE 3A shows a curve of a first polarity selective function which represents values taken from the curve shown in FIGURE 2A multiplied by the algebraic sign of corresponding values taken from the curve in FIGURE 2B, and plotted against successive values of phase difference $\theta$.
Figure 3B:
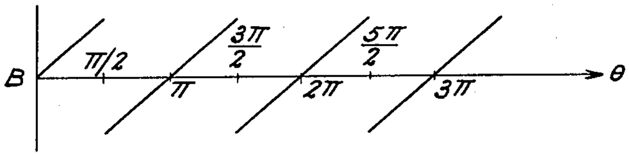
FIGURE 3B shows a curve of a second polarity function which represents values taken from the curve shown in FIGURE 2B multiplied by the algebraic sign of corresponding values taken from the curve shown in FIGURE 2A, reversed in sign, and plotted against successive values of phase difference $\theta$.

The two polarity selective functions thus produced are illustrated in FIGURE 3A and FIGURE 3B. In FIGURE 3A the values of "A" are plotted against $\theta$, and the relationship B is similarly plotted against $\theta$ in FIGURE 3B. It will be observed that the continuous character of the waveforms which is evident in FIGURES 1A, 1B and 1C, and carried through FIGURE 2A and 2B is lost in the derivation of the polarity selective functions "A" and "B." Thus, in FIGURES 3A and 3B, the polarity selective functions take the form of linearly ascending voltage functions in which the polarity reversals are practically instantaneous, and are not plotted.

The waveforms 3A and 3B shown in the drawings are now used to generate an entirely new function. The new function derived is a composite amplitude selective function which is determined in part by the disparity in absolute magnitudes between the functions "A" and "B" for corresponding values of $\theta$. This function employs values from both functions, and is given by:

$$C = A \text{ if } |A| < |B|$$
$$C = B \text{ if } |B| < |A|$$

Figure 4:
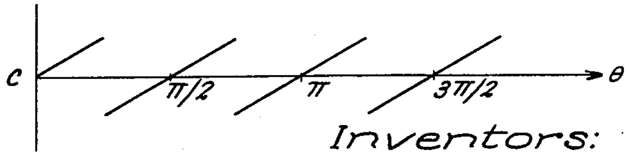
FIGURE 4 shows a composite amplitude selective function which represents the value of FIGURE 3A whenever the absolute value of this variable is less than the absolute value of the corresponding variable in FIGURE 3B, and similarly represents the value of FIGURE 3B whenever its absolute value of less than the corresponding value in FIGURE 3A for any given value of $\theta$.

The waveform of the amplitude selective function "C" is shown in FIGURE 4. It will be noted that FIGURE 4 has a characteristic in common with FIGURE 3A and FIGURE 3B, in that the function represents a series of ascending linear values which change sharply from maximum positive amplitude to maximum negative amplitude at both odd and even multiples of 90°. The function "C" is of vital importance in the practice of the present invention, because of the fact that the value of C is zero for all values for $\theta$ of 90° or integral multiples thereof. This, as will now be appreciated by those skilled in the art, provides a series of null or stable points for the servo circuit within the local oscillator, and assists the servo loop in producing a reference signal with a frequency and proper phase as compared to the incoming carrier.

The block diagram of one type of system which is suitable for deriving the waveform "C" is shown in FIGURE 5. In this figure, the numeral 10 has been used to indicate generally the circuits and components of the phase comparator stage provided by the present invention. The stage 10 will be seen to include a first product modulator 11 and a second product modulator 12. Each of the product modulators 11 and 12 is connected to sample the incoming received signal R. To the modulators 11 and 12 shown in the block diagram, there is connected a local oscillator 13.

The oscillator 13 is connected to feed a first quadrature signal $\phi_1$ to the product modulator 11, and a second quadrature signal $\phi_2$ to the product modulator 12. It will be appreciated from the foregoing discussion of FIGURE 1B and FIGURE 1C that the signals $\phi_1$ and $\phi_2$ are electrically separated in time by a 90° phase displacement. The output signal which is generated by the product modulator 11 is applied to a first low pass filter 14, because of the useful information which is present in the low frequency component. The signal derived by the product modulator 12 is applied to a low pass filter 15 for the same reason.

The filtered product function "*a*" available at the output terminals of the low pass filter 14 is applied to a multiplier stage 16 which acts in conjunction with a limited version of the function "*b*" to form the function "A."

The output potential generated by the low pass filter 15, on the other hand, is preliminarily supplied to an inverter 17 which has the function of reversing the polarity of the waveform. The waveform, with polarity reversal thus accomplished, is supplied to a multiplier stage 18. The stage 18 acts in conjunction with a limited version of the function "*a*" to form the function "B."

In the central portion of the drawing, the reference numeral 19 has been used to designate the limiter stage which receives and operates upon the function "$a$" in order to provide a second input potential for the multiplier stage 18. Directly above the low pass filter 15, the reference numeral 20 identifies a limiter stage which operates upon the function "$b$" in order to derive a second input signal for the multiplier stage 16.

The function "A" derived by the multiplier stage 16 is applied to a full-wave rectifier 21 in order to form the absolute value of this function. The function "B" derived by the multiplier stage 18 is applied in like manner to a full-wave rectifier 22 to form the absolute value of the function "B." In addition, the functions "A" and "B" derived by multiplier stages 16 and 18, respectively, are applied to transmission gates 25 and 26, respectively.

The absolute values of functions "A" and "B" are simultaneously supplied to a summing amplifier 23 which has the task of comparing the instantaneous absolute magnitudes of these functions and discovering the greater value therebetween. The output signal thus produced by the summing amplifier 23 is then applied to a limiter 24 to produce a gating signal. This gating signal is used to energize transmission gates 25 and 26. The gating signal supplied the transmission gate 25 is an inhibiting potential, while the signal supplied the transmission gate 26 is an enabling potential. Thus, where transmission gate 25 is inhibited, transmission gate 26 is enabled, and summing amplifier 27 receives an input of "B" from transmission gate 26 and no input from gate 25. Where gate 25 is enabled and gate 26 is inhibited, amplifier 27 receives an input of "A" from gate 25.

The output terminals of the transmission gates 25 and 26 are coupled directly to the input of a summing amplifier 27 which derives the composite amplitude selective function "C" shown in FIGURE 4. The input to summing amplifier 27 is, thus, either "A" or "B," depending on the output of limiter stage 24. In this way the desired function "C" is made available at the output of summing amplifier 27. As earlier mentioned in connection with the explanation of FIGURE 4, the value of the function "C" lies in the fact that the zero-axis crossings of the linearly rising portions of the curve occur at 90° and at all integral multiples of 90°.

Continuing with the detailed description of the invention, reference to FIGURE 6 of the drawings will now be made. The reference numeral 10 has again been used in this diagram to indicate generally the phase comparator circuits of the present invention one embodiment of which is shown in FIGURE 5. The comparator 10 in the receiver circuit is connected to receive the input signal R which may again take the form of a quaternary phase modulated signal. The quadrature signals $\phi_1$ and $\phi_2$ from the local oscillator 13′ are applied to the phase comparator stage 10. The output function "C" derived by the phase comparator stage is supplied to a sampler 28, and thence to a shaping network 29. The shaped output waveform generated by the network 29 is then applied as a corrective signal to the local oscillator 13′.

Sampler 28 is designed to receive short pulses (sampling pulses generated by an external synchronizing circuit, not shown) over conductor 40. These pulses occur at the mid-points of received signal modulation intervals (midway between allotted transition times) as seen at sampler 28, that is, delayed from the input by any incidental delays introduced by preselector stage 30 (FIGURE 7). It is at these times that the received wave is constrained to have one of the allowed phases. Sampler 28 acts to permit waveform "C," which represents the phase difference between the received signal R and the local oscillator signal $\phi_1$ to influence the remainder of the circuits only at these times. This assures that the circuit will attempt to correct for differences only at those times when a perfectly adjusted system will be free of them.

Shaping network 29 may comprise an equalizing or loop-shaping network, which averages or smoothes the output samples from sampler 28 to provide smooth control of oscillator 13′ and to reduce the influence of noise by averaging many samples or by restricting bandwidth. In addition, the loop-shaping is performed in such a manner that the overall servo-control action of the system is stable. The output potential of local oscillator 13′ is used to control the local oscillator, such as, by controlling its frequency or phase. In operation, if at one of the times when the phase of R is constrained to be one of the allowed values, the phase displacement $\theta$ is slightly greater than a multiple of 90°, function "C" will be positive, and sampler 28 will pass a positive sample to shaping network 29. This will cause a positive increment in the output of shaping network 29, and this positive increment will act to increase the frequency of local oscillator 13′. The increase in frequency will cause a progressive reduction in $\theta$. When $\theta$ reaches a multiple of 90°, function "C" will become zero, sampler 28 will pass only zero-amplitude pulses to shaping network 29, and shaping network 29 will cease to command a frequency change in local oscillator 13′. Thus, the system will come to rest with the error removed. This is a dynamic process in which the actual stable accomplishment depends in part on the proper design of shaping network 29. Because design of such servo systems are well known in the art, no further discussion will be presented here.

The operation of the system shown in FIGURE 6 will now be described in greater detail. In operation, the local oscillator frequency and the received carrier frequency are brought close enough for the servo loop to lock. Once this is accomplished, subsequent 90°, 180°, or 270° changes in the received phase cause the value of $\theta$ to shift from the neighborhood of one zero in the function "C" to another. Phase deviations from any multiple of 90° are readily detected and corrected. This adjustment of the carrier recovery circuit to compensate for variations in the carrier wave propagated by the transmitter as discussed immediately above, is accomplished by sampling the value of the function "C" derived by the phase comparator stage. The samples thus utilized may be integrated or smoothed to produce an error signal for the local oscillator. Then, the phase of the local oscillator is corrected by conventional circuits in accordance with the value of the integrated error signal. Thus, as referenced to in FIGURE 6, corrected values of $\phi_1$ and $\phi_2$ are then derived for use in the phase comparator stage 10. The performance of the system shown in FIGURE 6 may be referred to as a "compare then sample" type of operation.

The "compare then sample" performance is brought about because the function "C," which is the output of the phase comparator stage 10, is continuously generated, even though its value is representative of the phase error which is of concern only at the sampling instants. Sampler 28 assures that the remainder of the system is influenced only by the value of C at these instants. It will be obvious to those skilled in the art that the system could function in a "sample then compare" mode. This may be done by removing sampler 28 from its present position, having the output of phase comparator stage 10 fed directly to the input of shaping network 29, and inserting sampler 28 before phase comparator 10 to accept the input signal R in such a way that the signal R is allowed to pass to phase comparator stage 10 only at the sampling instants, which, are those instants when R is constrained to have one of the allowed phases.

In order to get the receiver started properly, a special signal may be propagated by the transmitter. If a steady phase signal is radiated, a conventional AFC circuit may be preliminarily utilized. A phase lock may then be obtained by using the functions "$a$," "$b$," "A," "B," *or* "C."

By using the functions "*a*" or "*b*," an unambiguous lock is provided, and coding may be done by selective phase shifts in the carrier. By using "A" or "B" as the error signal, a 180° ambiguity will be produced which may be used to distinguish readily between the channels in the quaternary transmission. This is highly advantageous for two-channel operation.

When the function "C" is employed, the occurrence of zero values in the function coincides with the number of allowed phase permutations and provides four-fold ambiguity. In such a case, the coding may be accomplished by controlling phase differences between successive phase-modulated time intervals in order to obtain an unambiguous interchange of information.

It is also possible to propagate an initial signal which takes the form of two phases by sending reversals in both channels. When this is done, a Doppler loop AFC of the type used in double sideband suppressed carrier transmission can be employed and a phase lock may be obtained by using either of the functions "A," "B," or "C."

Continuing with the detailed description, and turning to the block diagram of the overall receiver circuit used in practicing the invention, reference to FIGURE 7 will now be made. The reference numeral 30 is used in this diagram to designate a pre-selector stage connected to receive the incoming carrier wave. The wave R after pre-selection, is supplied to a carrier recovery stage 31 provided with a conventional AFC stage 32. This carrier recovery stage may comprise the circuits shown in FIGURE 6.

Pre-selector stage 30 is primarily a stage which functions to separate the signal R from all other signals which may appear at the input to the system. For example, if signals of many frequencies are received by an antenna which feed the apparatus, pre-selector stage 30 would be a frequency-selective stage, or stages, which rejects signals whose frequencies differed appreciably from the frequency of the desired signal R. More specifically, pre-selector stage 30 in one embodiment could represent the circuits included in a conventional superheterodyne receiver including the last IF stage, and the signal R would be the output signal derived from said last IF stage.

The output signal from carrier recovery stage 31 is applied to a pair of product modulators 33 and 34 and the signal R derived within the pre-selector stage 30 is supplied simultaneously to these modulator stages. The signals produced by the modulator stages are then fed to a pair of low pass filters 35 and 36 to generate filtered product functions. These filtered product functions are used as inputs to a pair of transmission gates 37 and 38 which supply input potentials to a detector logic stage 39.

It will be noted that the sampling pulses, mentioned hereinbefore, employed for synchronizing purposes are supplied to the carrier recovery stage and also supplied to the transmission gates 37 and 38 via conductor 40. The synchronizing pulses may be derived from synchronizing circuits (not shown) which operate on the output signals of low pass filters 35 and 36. A variety of well-known means for generating these sampling pulses are available. For example, see the A.I.E.E. Transactions Paper 58–30 which appears in "Communications and Electronics," Number 40, January 1959, pages 832–838, by Edison, Flavin and Perry.

These sampling pulses are coincident in time with the midpoints of modulation pulses, as seen at the various points at which the sampling pulses are applied. In one embodiment, synchronism may require delaying circuits (not shown) to be inserted in the input leads to transmission gates 37 and 38 to compensate for transmission delays in low pass filters 35 and 36.

Figures 6, 7:
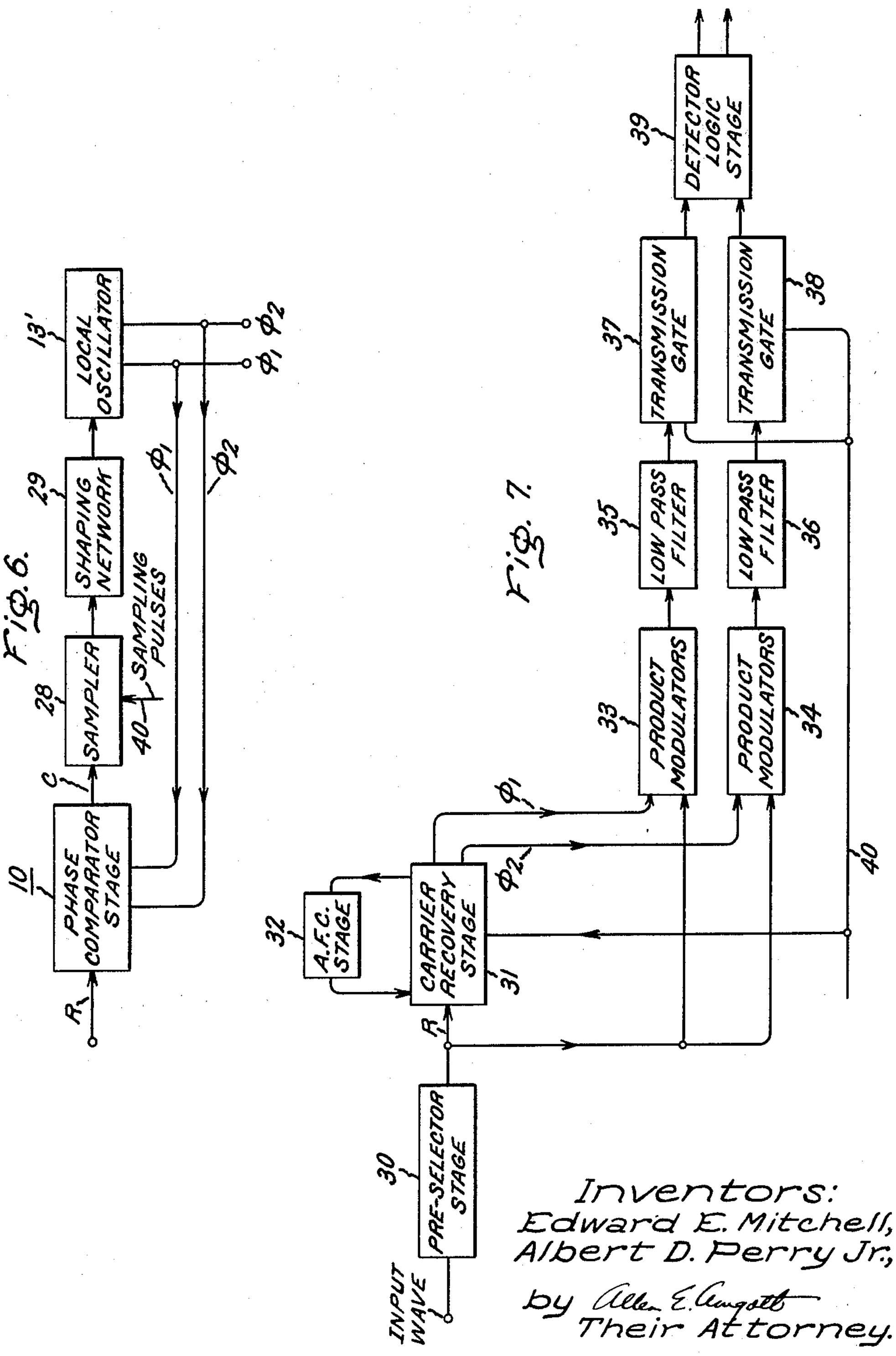
FIGURE 6 shows in block diagram form a system for sampling the error signal between the phase of the incoming carrier wave and the phase of a local oscillator after a phase comparison has been accomplished therebetween.
FIGURE 7 shows an overall block diagram of one form of receiver employed in practicing the present invention.

The detector logic stage 39 shown in FIGURE 7 may accomplish a slicing function if the coding is in terms of phase shift. If the coding is in the form of phase differences, on the other hand, a conventional memory or storage unit may be used in the logic stage 39.

As is well known in the art, the term "slicing" is generally used to describe cutting a wave along a fixed-voltage line. For example, in a binary detector, reference is made to a "slicing level" which is a voltage (or current) level that is selected as the point at which to divide signals into two classes accordingly as the signals exceed or fail to exceed this level. The system shown in FIGURE 6 essentially generates a reference signal (for example, $\phi_1$) which has an acceptable phase relationship with the carrier, and maintains this signal in a correct phase despite deliberate phase changes in the received wave.

The receiver shown in FIGURE 7 utilizes this reference signal to determine and report the deliberate phase changes. For example, a four-phase transmitter employs two carrier waves, I and II, with phases of 0° and 90°, respectively. Carrier waves I and II are double sideband suppressed carrier modulated by data waves from two sources. The transmitted signal is the sum of the modulator outputs. Thus, if both channels of the transmitter are at value +1, the output is the sum of a 0° and 90° vector, $1+j1$, which yields an angle of 45°. Similarly, if channel I's data signal is +1 and channel II's data signal is −1, there results a vector of $1-j1$, which yields an angle of −45°.

In the receiver shown in FIGURE 7, the local signal $\phi_1$ will be in one of four 45° phase positions, and by suitable use of a special start-up signal, the position can be assured to be +45°. The quadrature local signal, $\phi_2$, will be at 135° (with reference to the 0° signal at the transmitter). With this phasing, the outputs of transmission gates 37 and 38, for various input phases, are as appears in the table below.

| Input Phase | Output of Transmission Gate 37 | Output of Transmission Gate 38 |
|---|---|---|
| 45° | + | 0 |
| 135° | 0 | + |
| −45° | 0 | − |
| −135° | − | 0 |

The magnitudes of the signals plus and minus are not significant, the signs are all that are important. It is to be observed that slicing occurs at ground. The detector logic for this receiver would first determine if transmission gate 37 or 38 had the larger magnitude of output voltage, then assign the output 0 to one with the smaller magnitude, and finally determine the sign of the one with larger magnitude. The table shown above would then relate the decisions just made to the phase of the received wave, which is what the receiver, regarded as a phase detector, performs. The final function occurring in the detector logic stage 39 is that of relating the input phase to the transmitter data signals, assigning channels I and II each 1's if the phase were 45°, and so forth.

While FIGURE 7 represents one method of operation, other schemes can be employed to practice the invention. In one such scheme, signals $\phi_1$ and $\phi_2$ feeding product modulators 33 and 34, respectively, can be replaced with signals which lead $\phi_1$ and $\phi_2$ by 45°. This can be done by simply inserting 45° lead networks in the leads between carrier recovery stage 31 and product modulators 33 and 34. In this arrangement, $\phi_1$ is now in phase with carrier I and $\phi_2$ is in phase with carrier II. The outputs of transmission gates 37 and 38 would then be demodulated in a conventional demodulator and sampled versions of channels I and II. Thus, the detector logic stage in this arrangement would comprise a pair of sign-determining elements, one each for transmission gates 37 and 38.

In an alternate arrangement, instead of introducing 45° phase shifts in the local signals applied to product modulators 33 and 34, the circuits shown in FIGURE 7 may remain as is but the detector logic stage 39 may include means for generating two new signals, one of which is the sum of the outputs of transmission gates 37 and 38, and the other of which is the difference of the outputs of transmission gates 37 and 38. These two signals may now be applied to sign-determining circuits to yield, respectively, the demodulated sample version of channels I and II.

It is to be observed that all of the techniques described hereinbefore depend on setting $\phi_1$ to the correct one of four possible received phases. This setting may be avoided by suitably designing the transmitter in such a way that the difference in phase between the present input sample and the immediate preceding input sample represents the present data information (modulating information). In such an arrangement, the operation may proceed as described hereinbefore except for failing to select the "correct" one of the four phases for $\phi_1$, up to the point of determining the present received phase. In such a modified system, this phase in itself is not significant. It may be stored in a memory circuit of any convenient type, and the next phase is compared with the stored one. This comparison yields the phase change, which is significant in determining the modulating information. The old phase is then discarded and the then-current phase is stored for future use. While the invention has been described in connection with a four-phase transmission system, it will be recognized by those skilled in the art that the invention can be used in multiphase transmission systems as well. The complexity of using more than four phases involves modifying the phase comparator stage 10 and the detector logic stage 39.

In essence, the circuits shown in FIGURE 7 determine the components of the received signal (regarded as a two-dimensional vector, or phaser, in the standard A.C. circuit notation) along two orthogonal axes determined by the quadrature signals feeding product modulator 33 and 34. Knowing two orthogonal components of a vector, determination of its phase with respect to the axis chosen can easily be ascertained. Detector logic circuits may be employed to make this determination and report (or remember for comparison in the modified system discussed hereinbefore) the allowable phase closest to the phase which it determines. This "report" would represent the output of the detector logic stage. The report may be further processed, if desired, to get back to the transmitter inputs if the transmitter modulation logic is known.

Phase comparator stage 10 could be modified to provide use with multiphase operation of an order higher than four phase. Referring back specifically to FIGURE 5, product modulators 11 and 12 could be replaced by as many product modulators as there are distinct allowed phases except that two phases which differ by 180° may be handled by just one modulator for the pair. Thus, in FIGURE 5 there is employed just two modulators for a four phase system. If the local signals are in correct-phase relationship with the received signal, and that signal is noise-free, one of the detector outputs would be zero. If there is a phase displacement, due to errors in the local signal or to noise, it may be that no output is zero. The circuit determines the smallest output, determines by examining the other outputs whether to use the smallest output directly or inverted, and supplies the smallest output either direct or inverted to a shaping network and then to a controlled local oscillator, such as shown in FIGURE 6. It is to be observed that it is necessary to sample either before or after the comparison, similarly as described hereinbefore with regard to the four-phase system, to avoid supplying information obtained when the received signal is not constrained to have one of the allowed phases.

The detailed steps in generating the signal to be supplied to the shaping network will, in essence, be similar to that described in generating functions *a*, *b*, A, B, and C, except that where there are more phases, more functions and more complex comparisons are required. The object is to create a function similar to function "C" with as many zero crossings as there are allowed phases.

The term "constrained to have one of the allowed phases" which has been used in conjunction with a description of sampler 23 refers to the necessity in the overall design of the system to employ filters at both the transmitter and receiver, or exclusively at one or the other, which possess proper transient response characteristics. This is generally referred to as "intersymbol interference." This system must substantially be free of this intersymbol interference—the observations made at the sampling instants must reflect the effects of the current received symbol, and not the effects of either the previous or succeeding one. Thus, the particular filters to be employed must permit this and yet provide narrow-band operation. Since filters operable in this fashion are well-known and have been designed previously, no additional description is required.

While particular embodiments of the invention have been shown and described herein, it is not intended that the invention be limited to such disclosure, but that changes and modifications can be made and incorporated within the scope of the claims.

What we claim is:

1. The method of producing a composite phase differential signal characterized by a number of zero-axis crossings equal to the number of permitted phase positions in a phase modulated carrier which comprises multiplying the incoming carrier by each of a pair of quadrature signals to form a pair of product signals, changing the polarity of portions of each of said product signals to provide zero crossover signals having slopes of the same polarity and generating a phase differential signal composed of parts of said crossover signals selected on the basis of lesser magnitude.

2. The method of producing a composite phase differential signal characterized by a number of zero-axis crossings equal to the number of permitted phase positions in a phase modulated carrier which comprises multiplying the incoming carrier by each of a pair of quadrature signals to form a pair of product signals, filtering each of said product signals, changing the polarity of portions of each of said filtered product signals to provide zero cross-over signals having slopes of the same polarity, and generating a phase differential signal composed of parts of said crossover signals selected on the basis of lesser magnitude.

3. The method of producing a composite phase differential signal characterized by a number of zero-axis crossings equal to the number of permitted phase positions in a phase modulated carrier which comprises forming the product of an incoming carrier and each of a pair of quadrature signals, producing from each such product a crossover signal having a slope of a common polarity and deriving a phase differential signal composed of parts of said crossover signals selected on the basis of lesser magnitude.

4. The method of producing a composite phase differential signal characterized by a number of zero-axis crossings equal to the number of permitted phase positions in a phase modulated carrier which comprises forming the filtered product of the incoming carrier and each of a pair of quadrature signals, producing from each such filtered product a crossover signal having a slope of a common polarity, and deriving a phase differential signal composed of parts of said crossover signals selected on the basis of lesser magnitude.

5. A phase comparator stage for producing a composite phase differential signal with a predetermined number of zero-axis crossings which includes means for deriving a pair of quadrature reference signals, product modulator means for multiplying each of said pair of quadrature reference signals by the waveform of an incoming carrier, means including limiter stage means and multiplier means for deriving a crossover signal having a slope of a common polarity from the output signals produced by said modulator means, and means for deriving a composite phase differential signal from said crossover signals to produce a wavetrain characterized by said predetermined number of zero-axis crossings.

6. A phase comparator stage for producing a composite phase differential signal with a predetermined number of zero-axis crossings which includes means for deriving a pair of quadrature reference signals, product modulator means for multiplying each of said pair of quadrature reference signals by the waveform of the incoming carrier, filter means connected to receive an input signal from said modulator means, means including limiter stage means and multiplier means for deriving a pair of crossover signals from the output signals produced by said modulator means, and means for deriving a composite phase differential signal from said polarity selective signals to produce a wavetrain characterized by said predetermined number of zero-axis crossings.

7. A phase comparator stage for producing a composite phase differential signal with a predetermined number of zero-axis crossings which includes means for deriving a pair of quadrature reference signals, product modulator means for multiplying each of said pair of quadrature reference signals by the waveform of the incoming carrier, means including limiter stage means and multiplier means for deriving a pair of crossover signals from the output signals produced by said modulator means, and means including rectifier and gating means for deriving a composite phase differential signal from said zero crossover signals to produce a wavetrain characterized by said predetermined number of zero-axis crossings.

References Cited by the Examiner

UNITED STATES PATENTS

| | | | |
|---|---|---|---|
| 2,707,233 | 4/55 | Norton | 331—1 |
| 2,890,331 | 6/59 | Norton | 328—133 |
| 2,891,157 | 6/59 | Hansel | 331—1 |
| 2,897,363 | 7/59 | Gorgas | 328—133 |
| 2,930,891 | 3/60 | Lakatos | 325—329 |
| 2,938,114 | 5/60 | Krause | 325—50 |
| 2,961,533 | 11/60 | Martin | 325—421 |
| 2,991,354 | 7/61 | Crafts | 325—420 |

DAVID G. REDINBAUGH, *Primary Examiner.*

L. MILLER ANDRUS, *Examiner.*